US009026857B2

(12) United States Patent
Becker et al.

(10) Patent No.: US 9,026,857 B2
(45) Date of Patent: May 5, 2015

(54) METHOD AND SYSTEM FOR POSTPONED ERROR CODE CHECKS

(71) Applicants: Philipp Becker, Eisenberg (DE); Markus Eble, Walldorf (DE); Tobias Elfner, Schriesheim (DE); Ivan Galkin, Karlsruhe (DE); Vaidas Gasiunas, Hemsbach (DE); Arne Harren, Walldorf (DE); Maciej Kabala, Reilingen (DE); Klaus Kretzschmar, Angelbachtal (DE)

(72) Inventors: Philipp Becker, Eisenberg (DE); Markus Eble, Walldorf (DE); Tobias Elfner, Schriesheim (DE); Ivan Galkin, Karlsruhe (DE); Vaidas Gasiunas, Hemsbach (DE); Arne Harren, Walldorf (DE); Maciej Kabala, Reilingen (DE); Klaus Kretzschmar, Angelbachtal (DE)

(73) Assignee: SAP SE, Walldorf (DE)

( * ) Notice: Subject to any disclaimer, the term of this patent is extended or adjusted under 35 U.S.C. 154(b) by 174 days.

(21) Appl. No.: 13/656,091

(22) Filed: Oct. 19, 2012

(65) Prior Publication Data
US 2014/0115402 A1    Apr. 24, 2014

(51) Int. Cl.
*G06F 11/36* (2006.01)
*G06F 11/07* (2006.01)

(52) U.S. Cl.
CPC ........ *G06F 11/0751* (2013.01); *G06F 11/0793* (2013.01); *G06F 11/366* (2013.01)

(58) Field of Classification Search
CPC .............. G06F 11/0793; G06F 11/079; G06F 11/3664; G06F 11/3612; G06F 11/366; G06F 11/36
USPC .................. 714/35, 38.1, 38.13; 717/124, 133
See application file for complete search history.

(56) References Cited

U.S. PATENT DOCUMENTS

| | | | | |
|---|---|---|---|---|
| 5,748,936 A * | 5/1998 | Karp et al. | ..................... | 712/218 |
| 5,778,219 A * | 7/1998 | Amerson et al. | ............... | 712/244 |
| 6,301,705 B1 * | 10/2001 | Doshi et al. | ................... | 717/154 |
| 6,895,527 B1 * | 5/2005 | Quach et al. | ................... | 714/5.1 |
| 7,051,238 B2 * | 5/2006 | Gardner et al. | ............ | 714/38.13 |
| 7,310,723 B1 * | 12/2007 | Rozas et al. | ................... | 712/244 |

* cited by examiner

*Primary Examiner* — Joseph Schell
(74) *Attorney, Agent, or Firm* — Buckley, Maschoff & Talwalkar LLC

(57) ABSTRACT

According to some embodiments, a system and method for determining a value for an error code for a program operation; determining whether the operation supports postponing a determination of an occurrence of an error for the operation; proceeding to evaluate a next operation in an instance the operation does support postponing the determination of an occurrence of an error for the operation; and checking the error code for the operation in an instance the operation does not support postponing the determination of an occurrence of an error for the operation.

18 Claims, 4 Drawing Sheets

METHOD AND SYSTEM FOR POSTPONED ERROR CODE CHECKS

FIELD

Some embodiments relate to error checking. More specifically, some embodiments relate to a method and system for efficiently and robustly checking errors associated with program applications.

BACKGROUND

According to some programming semantics and some application programs, an error code or a return code may be passed from an operation or process when the process completes its execution or task. The error or return code indicates either an error or successful completion of the task. In some aspects, error handling, that is the tracking of errors and the response thereto, may be a significant concern of the application program since error handling may consume a substantial amount of computing resources and/or time.

Some application programs may check for errors after every processing calculation or operation. While such a strategy may operate to catch all errors, this methodology of checking for errors immediately after each operation is rather time consuming.

Due to some of the foregoing realities, methods and systems are desired to efficiently and accurately handle errors associated with application programs.

DETAILED DESCRIPTION

In an effort to more fully and efficiently use the resources in a computing environment, a programming methodology and techniques of using the programming methodology may be developed to check for return codes including errors of program operations executed by the computing environment. In some embodiments herein, a programming methodology and techniques for using the programming methodology (i.e., algorithms) are provided for efficiently checking for runtime errors by intelligently evaluating a return code associated with an execution of an operation.

As used herein, the term operation refers to a processor-executable instruction. The operation may comprise a set of instructions or an application program that is executed by a processor. In some embodiments, the operation may include program instructions to call function(s) to be executed by the processor. In some aspects, the processor may include a plurality of processor and/or processing units, and may be present in distributed and parallel processing environments. The multiple processing units may be processors, processor cores, multi-core processors, etc. In some aspects, the processing units may access a main memory (i.e., a shared memory architecture). The processing units may run or execute the same program(s) and/or operations.

Figure 1:
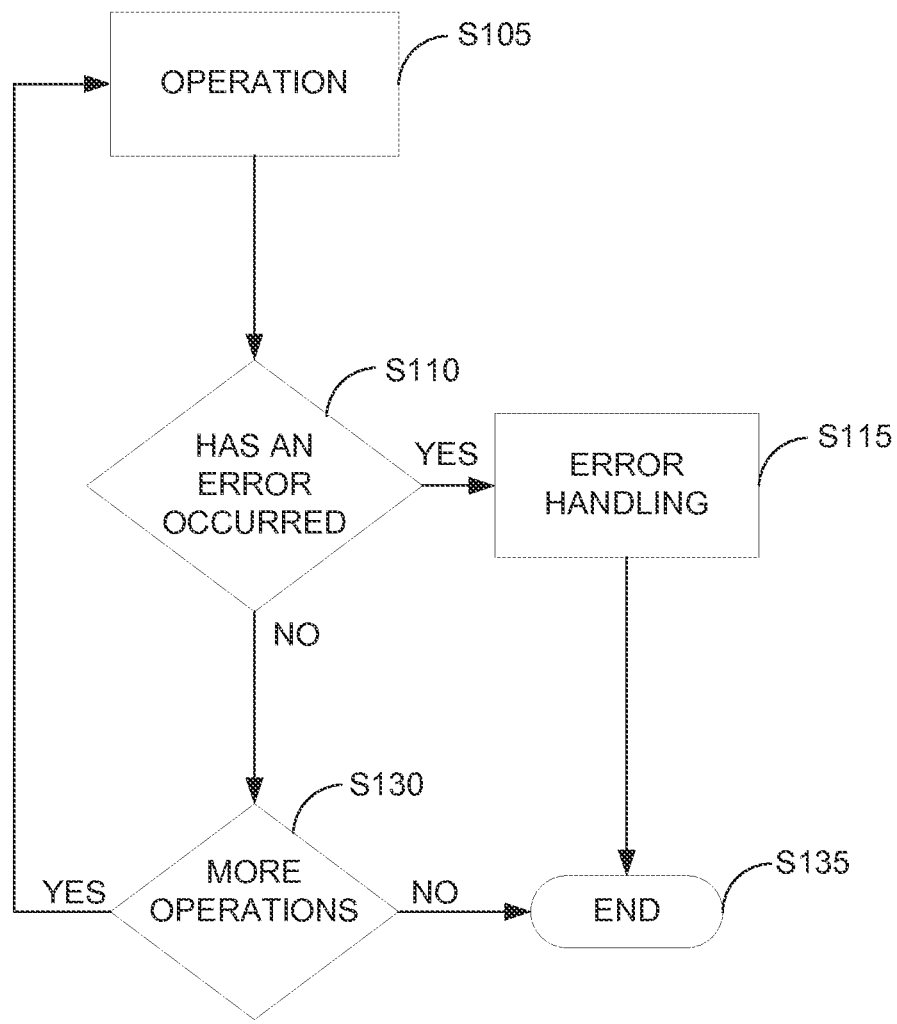
FIG. 1 is a flow diagram of a process, according to an embodiment.

FIG. 1 is a flow diagram of a process related to a conventional method of checking for errors of an executing application program. According to, for example, the semantics of some programming languages, there may be a rule to check for errors after each operation of the program that may produce certain kind of errors. FIG. 1 relates to an error handling process 100 that checks for runtime errors after each call to a function that might fail. The error handling process 100 involves evaluating the return code of the function. At S105, a first operation is executed by a processor in accordance with the program instructions of the application program. A return code is passed from the called function when the operation has finished executing an operation thereof. The error check associated with the first operation is performed at S110 when the first operation is completed. The error checking comprises a conditional (execution) branch in the application program as illustrated by steps 115-130. For example, if an error is detected at S115, then process 100 proceeds to error handling branch S120. Error handling branch S120 may function to allow the program to continue in the presence of errors. In some aspects, errors may arise from invalid calculations, limited system resources, coding mistakes, hardware failures, invalid inputs, invalid outputs (e.g., results) and other types and sources of failures.

Process 100 continues to S130 after the error handling, the same as it would if an error is not detected at S115. At S130, a determination is made regarding whether more operations are to be executed. In the event that the program is to execute additional operations, then process 100 returns to S105 to execute and check for errors related to the next operation. Process 100 may continue for each and every operation of a program until no more operations are to be executed, as determined at S130. In the event that no more operations are to be executed, then process 100 may terminate at S135.

As illustrated by FIG. 1, process 100 checks the return code after every operation. Per process 100, error handling is started for each operation in the instance there is an error. The error handling creates a conditional branch. Such error checks are expensive with regard to an application program's compile time and runtime. For example, at compile time the conditional branch may increase the number of branches that an optimizer must traverse. Similarly, at runtime, each conditional branch needs to be considered by the "branch prediction" mechanism. If the branch prediction fails, then the command pipeline has to be rebuilt which requires additional computing time and resources.

In some regards, error checking as described above with respect to FIG. 1 may be implemented using conditional statements or instructions to execute error handling code if a specified condition is true (i.e., the return code indicates there is an error) and other code or application program instructions if the condition is false (i.e., proceed to a next operation). In some embodiments herein, a process and system provide a mechanism to check for error(s) on each program call to a function (e.g., operation), which limits or decreases the number of branches required to check and handle all potential errors. In some embodiments, a process and system herein provide enhanced efficiencies at both compile time and runtime. In some aspects, embodiments herein may operate to limit, decrease, or eliminate the number of branches created to determine error checks of application program operations by limiting, decreasing, or eliminating the number of conditional statements in implementations of the embodiments.

Figure 2:
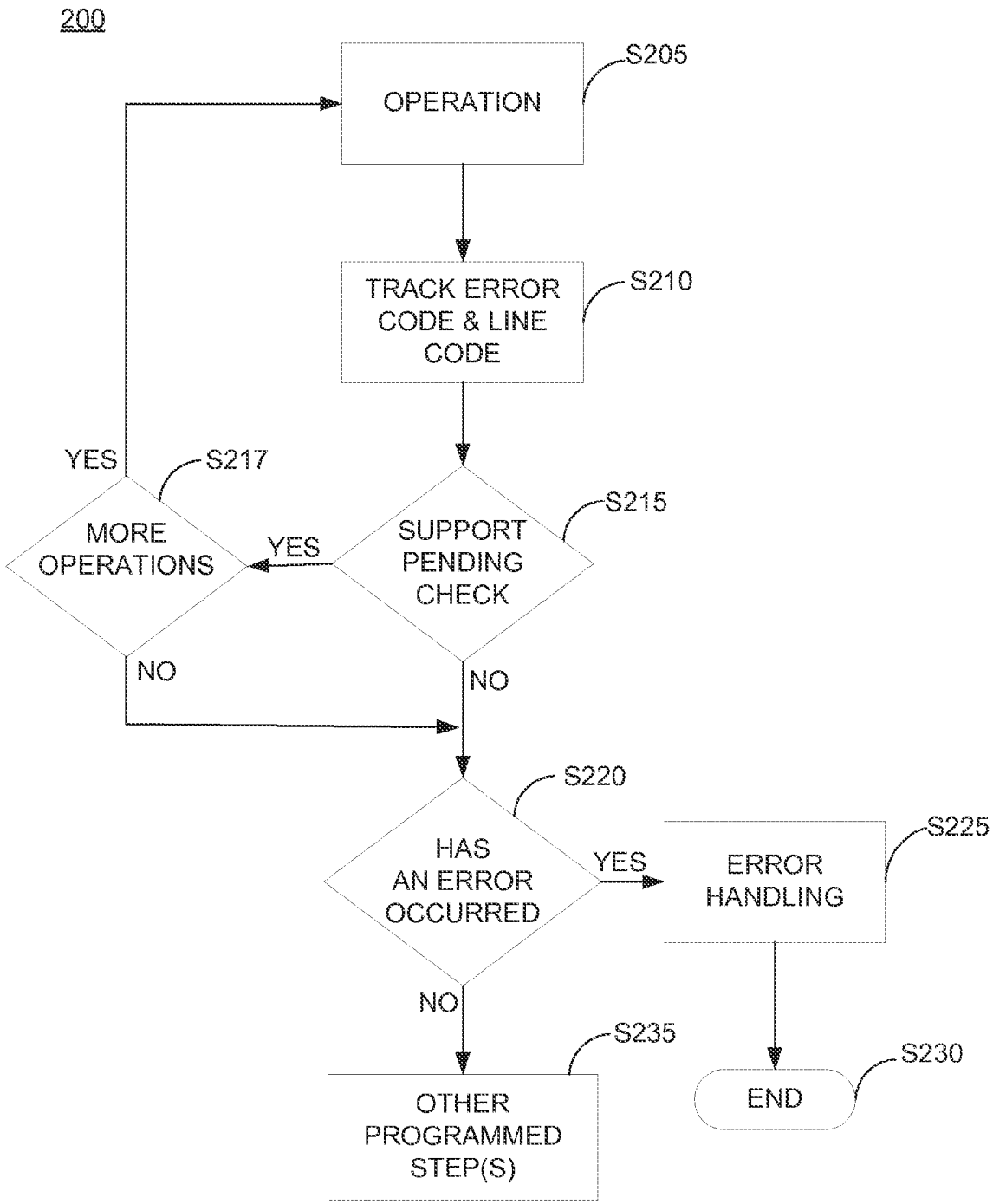
FIG. 2 is a flow diagram of a process, relating to some embodiments herein.

FIG. 2 is a flow diagram related to a process 200, in accordance with some embodiments herein. FIG. 2 relates to an error handling process 200 that postpones an actual check for an occurrence of an error (i.e., an error check) until after a call to a function that provides a permanent result or a side effect. As used herein, a result of an operation that does not have an impact or effect on other operations and does not impact a state of a system is referred to as being side-effect free. At S205, a first operation is considered by a processor in accordance with the program instructions of the application program. Process 200 operates to preserve an error code and a location of the error code passed from the operation at S210.

In some aspects, the error code and the location of the error code passed from S205 are preserved at S210 in the event or instance an error has occurred, as will be determined in a further processing step discussed in detail below. In some embodiments, the tracked error code and a location of that error code may be aggregated with other such code(s) and location(s). At S210, the value of the return code is determined but it is not checked and no action is taken to handle an error condition, if an error check were to indicate the occurrence of an error.

At S215, during the compilation of the program, a determination is made as to whether the operation supports postponing determining the occurrence (or not) of an error code associated with the executed operation of S205. It is noted that the operation is referred to herein as supporting the postponing of a determination of an error code associated with the executed operation of S205 if the results of the operation are side-effect free.

As an illustrative example, a program application may include a mathematical computation (i.e., an operation) that produces an intermediate result. The intermediate result of the operation may be an error such as, for example, an arithmetic overflow. The program application may continue its calculations until the result becomes permanent. Immediately before the result becomes permanent, the postponed error code check is executed. Then, the error is detected and all intermediate results are discarded. As such, the computation of the intermediate result(s) does not cause a permanent system change (i.e., it is side-effect free).

In the event it is determined at S215 that the operation supports postponing of a determination of an error code check associated with the operation, process 200 proceeds to operation S217 where it is determined whether additional operations are to be considered. If there are more operations, then process 200 proceeds to S205 where execution of a next operation is considered. Process 200 may recursively flow from S205 to S210 to S215 to S217 until it is determined at S215 that the just considered operation does not support postponing of a determination of the error code associated with the operation. In this scenario, process 200 moves to S220 where the error code associated with the operation of S205 is checked to determine whether an error has occurred.

In the instance that the error code check at S220 indicates the occurrence of an error, process 200 proceeds to error handling at S225.

Process 200 may typically continue to S230 after the error handling of operation S225. In an instance, if the error code check of operation S220 indicates no error, then process 200 proceeds to another (i.e., a next programmed) operation, as illustrated by the operation S230.

In some embodiments, a process including at least some of the aspects of FIG. 2 may be implemented using a select instruction. The select instruction herein allows the conditional selection of a value from two inputs without creating a conditional (execution) branch. For example, the select instruction may have the syntax of Result=select cond, valueA, valueB The select instruction or statement logically evaluates a condition and selects a result from the two values, "valueA" or "valueB". The select statement does not operate to create a conditional branch. The select statement and the code depending on its result is executed in a processor in a same execution branch.

In some aspects, the select statement or instruction (or functional equivalent) herein may logically replace a programming conditional statement or instruction. In some embodiments, a combination of the use of a select instruction or statement (or functional equivalent) as disclosed herein and the logic of postponing the determination of an error check operations provides a mechanism to efficiently check for runtime errors by intelligently evaluating an error code associated with an execution of an operation.

As illustrated by FIG. 1, process 100 for checking for errors for each operation creates a conditional branch. Such error checks are expensive with regard to an application program compile time and runtime.

In some embodiments herein, a process and system provide a mechanism to check for error(s) on each program call to a function (e.g., operation) that limits or decreases the number of branches created to determine each error check. In some embodiments, a process and system herein provide enhanced efficiencies at both compile time and runtime.

In some embodiments, program instructions or the like for logically implementing aspects such as those of herein (e.g., process 200) may be represented by the following (pseudo) code.

```
Initialization:
    errorCode = ok;
    errorLine = 0;
Operation n:
    currentErrorCode = call FunctionN(param0, param1, ... );
    wasOk = (errorCode==ok);
    errorCode = select wasOk, currentErrorCode, errorCode;
    errorLine = select wasOk, currentLine, errorLine;
    // continue with operation n+1
Operation n+1:
...
Operation not supporting pending check:
    if( errorCode!=ok ) {
        goto ErrorHandling;
    } else {
        goto doOperation not supporting pending check;
    }
doOperation not supporting pending check:
    errorCode = call FunctionM(param0, param1, ... );
    ...
```

As illustrated by the above code snippet, an error code is checked for an operation n. As discussed above with respect to FIG. 2, an error code is obtained for each operation. Furthermore, a select statement is used to track an error code and a line number corresponding to the error code of each operation (e.g., operation n, operation n+1, . . . ). As seen, each of the select statements evaluate a condition (i.e., "wasOk") and selects a value from two inputs. As mentioned above, the select statement does not create a conditional (execution) branch.

Per the above example code, operations including a next operation (i.e., operation n+1) will continue to be executed with the error code and corresponding error line number thereof being tracked until the case wherein an operation does not support a pending error check. In the event that an operation does not support a pending check (i.e., postponing of the error check), the return code is checked and, depending on the indicated error, an error handling branch is entered (i.e., the "if" statement) or the computation is continued (i.e., "else goto doOperation not supporting pending check"). Accordingly, a conditional branch may only be needed immediately before each operation that does not support pending checks. The use of a select statement (or an equivalent thereof) as illustrated above eliminates the use of conditional statements to track an error and its line number and the conditional branches associated therewith. This aspect combined with the postponing of the determination of the error code check is also demonstrated by the above code and FIG. 2.

In some aspects, processes disclosed herein may allow enhanced performance proficiencies by, for example, postponing a determination of an error code check until a result having a side effect is encountered in the executing of a sequence of operations.

In some use-cases, all operations until the first error code check may occur on a single line of code. In such circumstances, the line number associated with an error code of an operation may not need to be tracked for all instructions. This scenario is typical for mathematical calculations. For example, a line of programming code may include the following:

$$result = valueA + valueB + valueC * valueD \qquad (1)$$

In this example, there are multiple arithmetic operations that can result in an error. An error check is necessary before performing the assignment to the result variable, since it is the first operation with a side-effect. The line number of all the arithmetic operations of expression (1) is the same. Thus, it is sufficient to know the line number of the entire expression and it is not necessary to individually track a line number associated with each operation comprising the above expression.

In some use-cases, all operations related to a function or execution of a program instruction may have, at most, only one possible error code or be zero to denote successful completion (i.e., no error). In such circumstances, tracking of the error code corresponding to the operation(s) may be realized by using a binary OR instruction or statement. In this manner, the tracking of the (single) error code may be more efficient and/or simplified.

In some use-cases, all operations related to a function or execution of a program instruction may have, at most, (1) the same possible error code and (2) all of the operations may occur in the same line, then tracking of the error code corresponding to the operations may be realized by one OR instruction on the error code. Simultaneous satisfaction of these two conditions may occur when calculating mathematical expressions. For example, for the expression (1) above, the only error that may occur is an "Arithmetic Overflow" error and all of the operations for the expression (1) occur as a result of a single line of code.

In some embodiments, program instructions or the like for logically implementing aspects of expression (1) may be represented by the following (pseudo)code.

```
Operation 0:
    currentErrorCode = add(tempResult0, valueA, valueB);
    errorCode = currentErrorCode;
    // continue with operation 1
Operation 1:
    currentErrorCode = mul(tempResult1, valueC, valueD);
    errorCode = errorCode OR currentErrorCode;
    // continue with operation 2
Operation 2:
    currentErrorCode = add(tempResult2, tempResult0, tempResult1);
    errorCode = errorCode OR currentErrorCode;
    goto CheckBeforeAssignResult;
CheckBeforeAssignResult:
    if( errorCode != ok ) {
        errorLine = currentLine;
```

-continued

```
        goto ErrorHandling;
    } else {
        goto AssignResult;
    }
AssignResult:
    result = tempResult2;
...
ErrorHandling:
...
```

As illustrated by the above code snippet, an error code is tracked for each operation comprising expression (1), including Operation 0 (i.e., add valueA and valueB to get tempResult0), Operation 1 (i.e., multiply valueC and valueD to get tempResult1), and Operation 2 (i.e., add tempResult0 and tempResult1 to get tempResult2). As illustrated, no error line tracking is performed for each operation by the above example code since the error (if any) can only occur on one line, the current line that encompasses all of the arithmetic operations. Also shown is an efficient implementation for tracking the error code (if any) by using an OR statement. This example code also demonstrates that before a final result is recorded or assigned, an error check is made to determine whether an error has occurred. If there is an error, then (and only then) is the error line actually checked and error handling commenced. If no error occurs, then the result of the completed operations (i.e., Operation 0, Operation 1, and Operation 2) is recorded or assigned.

Per the present example, operations of the function will continue to be executed with an efficient and intelligent tracking of the error code(s) using an OR statement (or the like) and without a need for continually tracking the associated line number. After all of the associated calculations have been completed, only then is an error handling branch entered (i.e., the "if" statement) or is result finally saved (e.g., saved to an externally visible variable).

Figure 3:
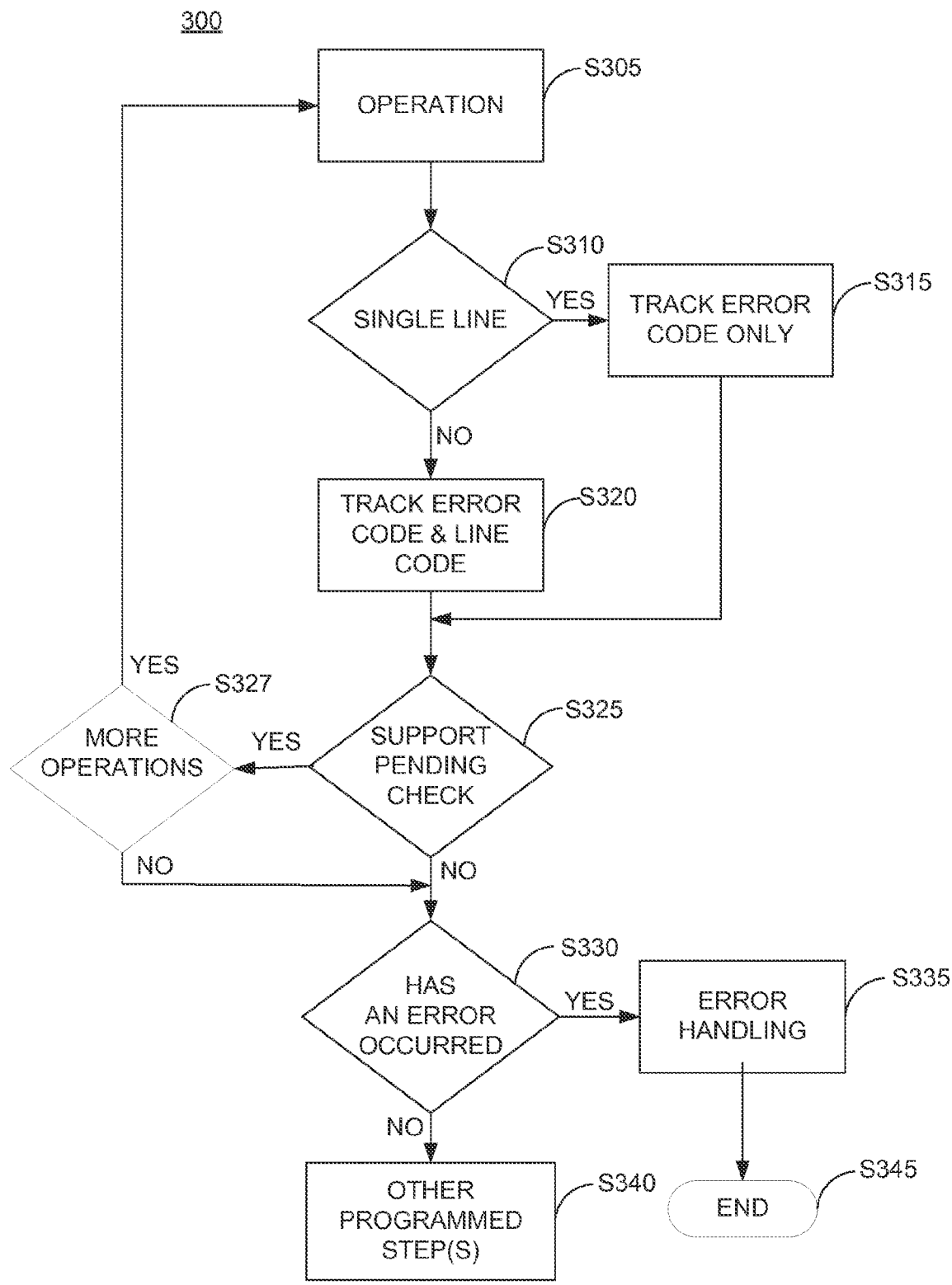
FIG. 3 is a flow diagram of a process, according to some embodiments.

FIG. 3 relates to a process 300, according to some embodiments herein. In some embodiments, process 300 considers an operation at S305. At S310, during compilation, a determination is made as to whether all of the affected operations occur on a same single line. If the determination at S310 is in the affirmative, then the process 300 advances to S315 where an error code and not a line number for the error code is tracked. If the determination at S310 is in the negative, then process 300 continues to S320 where both an error code and an associated line number for the error code are tracked.

As process 300 flows to S325 a determination is made whether the operation supports pending error checks. That is, at compilation, a determination is made as to whether the operation supports postponing of a determination of an error code check for the operation of S305. In the event it is determined at S325 that the operation supports postponing of a determination of an error code check, process 300 proceeds to operation S327. Operation S327 determines whether additional operations are to be considered. If so, process 300 returns to operation S305 where a next operation is executed.

Process 300 may recursively flow from S305 to S325 until it is determined at S325 that the just considered operation does not support postponing of an error code check for the operation. In such an instance, process 300 moves to S330 where an error code associated with the executed operation of S305 is determined.

In the instance that the code associated with the executed operation is determined to indicate an error at S330, process 300 proceeds to error handling branch at S335. Process 300 continues to termination point S345 after the error handling of operation S335 to return the code for the operation not supporting a pending (return code) check. In an instance, the error code check of operation S330 indicates no error, then process 300 proceeds to another (i.e., a next programmed) operation, as illustrated by the operation S340.

In some embodiments herein, disclosed processes include postponing a determination of an occurrence of an error code until an operation is encountered that does not support a pending error check. Stated another way, some embodiments herein include postponing a determination of an actual value for an error code associated with an operation until an operation is encountered that is not side-effect free. As such, in some aspects, it may be beneficial to determine operations that are side-effect free or produce only transient results. Herein, transient results of an operation do not cause a system change and may not be visible or impact the error handing or the code executed afterwards.

Regarding some error handling aspects, only operations that do not have an effect that is visible after an error is handled can be executed while an error check is pending, according to some embodiments herein. That is, while an error check is being postponed (i.e., the error check is pending), only side-effect free operations may be performed. In general, effects that are not visible after the detection of an error may include calling side-effect free functions and assigning values to local variables that are not visible to an error handling (execution) branch.

In some embodiments, a function may be declared, marked, flagged, or otherwise noted as being side-effect free. Designating or otherwise indicating that a function is side-effect free may operate to provide an indication that the noted operation does not make changes to a global system state. Accordingly, an operation having an associated "side-effect free flag" (or an equivalent) can be executed during pending checks. That is, an operation having an associated "side-effect free flag" (or an equivalent associated indicator) can support pending checks. In some embodiments, a determination of whether an operation supports pending checks (e.g., S215) may be based on a presence of a "side-effect free flag" or other equivalent indicator associated with the operation.

In some embodiments, local or transient variables may be changed before an error handling branch is entered since they are not visible, useable, or available to the error handling branch or the code executed afterwards. That is, local variables that "die" in the case of an error before an error handling branch is entered may be changed while a return code check is pending. Accordingly, operations including local variables may support pending (return) code checks.

The following example code (or pseudo-code) illustrates a use-case example including an operation having local variables and supporting pending (return) code checks:

```
calculateResult (Value1, Value2, Value3) {
    tempResult0 = 0;                    // tempResult0 is visible in the
                                        catch
    try {
        tempResult1 = 0;                // tempResult1 is not visible in
        tempResult1 = value1 + Value2;  //the pending check
        tempResult0 = tempResult1;      // execute any pending check
        tempResult2 = Value2 + Value3;  // pending check
        tempResult0 = 2 * tempResult2;  // execute any pending check
        Value3 = tempResult0            // execute any pending check
    } catch (ArithmeticOverflow) {
        // access to tempResult0, Value1,Value2, Value3 is possible
        // but not tempResult1, tempResult2;
    }
}
```

The above code snippet illustrates an operation that uses local variables. Additionally, the example code also uses "try and catch" statements to detect and handle errors since a developer may want to catch an error and then perform error handling, as opposed to aborting an executing program. Thus, the "try and catch" programming is illustrated above.

All local values generated in the "try" block (e.g. tempResult1, tempResult2) are not visible in the "catch" block. Only those variables declared before the "try" block are visible or usable in the "catch" block. As such, tempResult1 and tempResult2 are transient and are destroyed when an error occurs. However, tempResult0, declared before the "try" block, is visible in the "catch" block of code. In the present example, values for tempResult1 and tempResult2 may be changed while return code checks are pending, whereas values for tempResult0, Value3 (as well as Value1 and Value2) are checked for errors at the calculation thereof since their values are later visible and to ensure their values are consistent.

Figure 4:
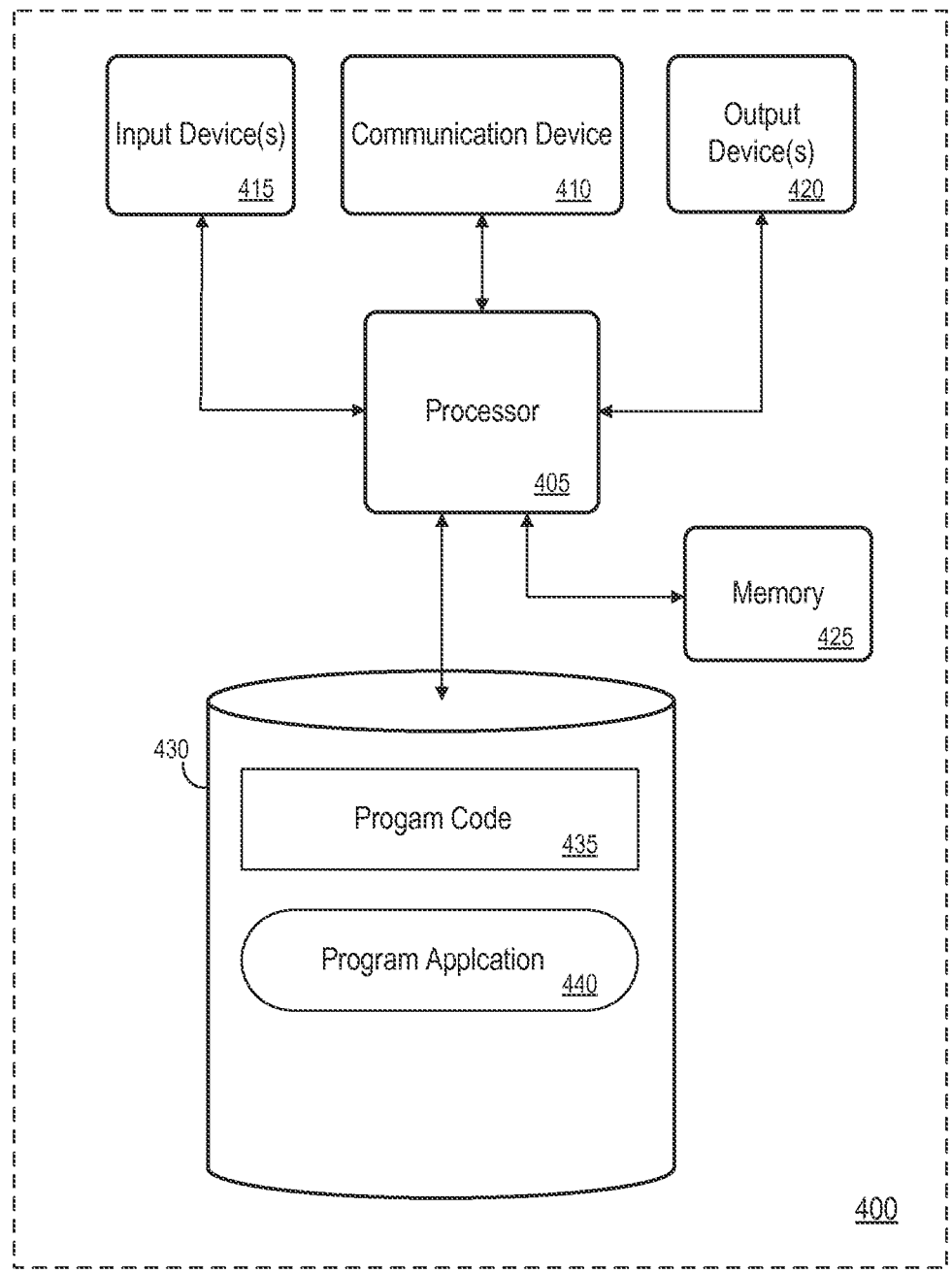
FIG. 4 is a block diagram of a system, according to some embodiments.

FIG. 4 is an illustrative block diagram of a system 400 that may be used to implement some embodiments herein. In some aspects, processes disclosed herein may be implemented, at least in part, by system 400. System 400 may comprise a general-purpose computing apparatus and may execute program code to perform any of the processes described herein, such as, but not limited to processes 200 and 300. System 400 may include elements other than those specifically depicted in FIG. 4, according to some embodiments.

System 400 includes processor 405 operatively coupled to communication device 410, data storage device 430, one or more input devices 415, one or more output devices 420 and memory 425. Communication device 410 may facilitate communication with external devices, such as an external design tool. Input device(s) 415 may comprise, for example, a keyboard, a keypad, a mouse or other pointing device, a microphone, knob or a switch, an infra-red (IR) port, a docking station, and/or a touch screen. Input device(s) 415 may be used, for example, to enter information into system 400. Output device(s) 420 may comprise, for example, a display (e.g., a display screen) a speaker, and/or a printer.

Data storage device 430 may comprise any appropriate persistent storage device, including combinations of magnetic storage devices (e.g., magnetic tape, hard disk drives and flash memory), optical storage devices, Read Only Memory (ROM) devices, etc., while memory 1160 may comprise Random Access Memory (RAM).

Program code 435 of data storage device 430 may be executable by processor 405 to provide any of the processes described herein. In some embodiments, program code 435 may include for example, code of an operating system (OS). Embodiments are not limited to execution of these processes by a single apparatus. Application program 440 may include instructions that may be executed processor 405. Data storage device 430 may also store data and other program code for providing additional functionality and/or which are necessary for operation thereof, such as device drivers, operating system files, etc.

Each system described herein may be implemented by any number of devices in communication via any number of other public and/or private networks. Two or more of the devices herein may be co-located, may be a single device, or may be located remote from one another and may communicate with one another via any known manner of network(s) and/or a dedicated connection. Moreover, each device may comprise any number of hardware and/or software elements suitable to provide the functions described herein as well as any other functions.

All systems and processes discussed herein may be embodied in program code stored on one or more computer-readable media. Such media may include, for example, a floppy disk, a CD-ROM, a DVD-ROM, magnetic tape, and solid state Random Access Memory (RAM) or Read Only Memory (ROM) storage units. According to some embodiments, a memory storage unit may be associated with access patterns and may be independent from the device (e.g., magnetic, optoelectronic, semiconductor/solid-state, etc.) Moreover, in-memory technologies may be used such that databases, etc. may be completely operated in RAM memory at a processor. Embodiments are therefore not limited to any specific combination of hardware and software.

Embodiments have been described herein solely for the purpose of illustration. Persons skilled in the art will recognize from this description that embodiments are not limited to those described, but may be practiced with modifications and alterations limited only by the spirit and scope of the appended claims.

What is claimed is:

1. A computer implemented method, comprising:
   determining, by a processor, a value for an error code for an executed program operation, the executed program operation being one of a plurality of processor-executable instructions of a set of program operations;
   determining, by the processor, whether the executed program operation supports postponing a determination of an occurrence of an error for the executed program operation, the determining of whether the executed program operation supports postponing of the determination of an occurrence of an error for the executed program operation is based on the executed program operation being side-effect free;
   proceeding to evaluate a next executed program operation of the plurality of processor-executable instructions of the set of program operations in an instance the executed program operation supports postponing the determination of an occurrence of an error for the executed program operation; and
   checking determining whether the determined value for the error code for the executed program operation indicates an occurrence of a runtime error in an instance the executed program operation does not support postponing the determination of an occurrence of an error for the executed program operation.

2. The method of claim 1, further comprising determining a line associated with the error code.

3. The method of claim 1, wherein the determining of whether the executed program operation supports postponing the determination of an occurrence of an error for the executed program operation is implemented without creating a conditional branch.

4. The method of claim 1, further comprising associating, with the program operation, an indication that the program operation supports postponing a determination of an occurrence of an error for the executed program operation; and
   the determining of whether the executed program operation supports postponing a determination of an occurrence of an error for the executed program operation is based on the indication.

5. The method of claim 1, wherein the executed program operation being side-effect free includes the executed program instruction having a result that is free of having an impact on another operation, including a state of another operation.

6. The method of claim 1, wherein the determining of whether the executed program operation supports postponing a determination of an occurrence of an error for the executed program operation comprises determining whether a variable associated with the executed program operation is accessible to an error handling branch.

7. A system, comprising:
   a memory having program instructions of a plurality of program operations of a set of program operations stored therein;
   a processor in communication with the processor to execute the program instructions to:
      determine, by the processor, a value for an error code for a first executed program operation of the plurality of program operations, the program operations being a processor-executable instruction;
      determine, by the processor, whether the first executed program operation supports postponing a determination of an occurrence of an error for the first executed program operation, the determining of whether the executed program operation supports postponing of the determination of an occurrence of an error for the executed program operation is based on the executed program operation being side-effect free;
      proceed to evaluate a second executed program operation of the plurality of program operations of the set of program operations in an instance the first executed program operation does support postponing the determination of an occurrence of an error for the first executed program operation; and
      checking determining whether the determined value for the error code for the first executed program operation indicates an occurrence of a runtime error in an instance the first executed program operation does not support postponing the determination of an occurrence of an error for the first executed program operation.

8. The system of claim 7, further comprising the processor to determine a line associated with the error code.

9. The system of claim 7, wherein the determining of whether the first executed program operation supports postponing the determination of an occurrence of an error for the first executed program operation for the executed program operation is implemented without creating a conditional branch.

10. The system of claim 7, further comprising the processor to associate, with the first executed program operation, an indication that the first program operation supports postponing a determination of an occurrence of an error for the first executed program operation for the first executed program operation; and
    the determining of whether the first executed program operation supports postponing a determination of an occurrence of an error for the first executed program operation is based on the indication.

11. The system of claim 7, wherein the first executed program operation being side-effect free includes the executed program instruction having a result that is free of having an impact on another operation, including a state of another operation.

12. The system of claim 7, wherein the determining of whether the first executed program operation supports postponing a determination of an occurrence of an error for the first executed operation comprises determining whether a variable associated with the first executed program operation is accessible to an error handling branch.

13. A non-transitory computer-readable medium having program instruction stored thereon, the medium comprising:

instructions to determine a value for an error code for an executed program operation, the program operation being one of a plurality of processor-executable instructions of a set of program operations;

instructions to determine whether the executed program operation supports postponing a determination of an occurrence of an error for the executed program operation, the determining of whether the executed program operation supports postponing of the determination of an occurrence of an error for the executed program operation is based on the executed program operation being side-effect free;

instructions to proceed to evaluate a next executed program operation of the plurality of processor-executable instructions of the set of program operations in an instance the operation does support postponing the determination of an occurrence of an error for the executed program operation; and instructions to check determine whether the determined value for the error code for the executed program operation indicates an occurrence of a runtime error in an instance the operation does not support postponing the determination of an occurrence of an error for the executed program operation.

14. The medium of claim 13, further comprising instructions to determine a line associated with the error code.

15. The medium of claim 13, wherein the determining of whether the executed program operation supports postponing the determination of an occurrence of an error for the executed program operation is implemented without creating a conditional execution branch.

16. The medium of claim 13, further comprising instructions to associate, with the program operation, an indication that the program operation supports postponing a determination of an occurrence of an error for the executed program operation; and the determining of whether the executed program operation supports postponing a determination of an occurrence of an error for the executed program operation is based on the indication.

17. The medium of claim 13, wherein the executed program operation comprises determining the operation being side-effect free includes the executed program instruction having a result that is free of having an impact on another operation, including a state of another operation.

18. The medium of claim 13, wherein the determining of whether the executed program operation supports postponing a determination of an occurrence of an error for the executed program operation comprises determining whether a variable associated with the executed program operation is accessible to an error handling branch.

* * * * *